(12) United States Patent
Winzell et al.

(10) Patent No.: US 12,333,062 B2
(45) Date of Patent: Jun. 17, 2025

(54) VEHICLE AUDIO SENSOR FUSION AND OCCUPANT FEEDBACK SYSTEM

(71) Applicant: Volvo Car Corporation, Gothenburg (SE)

(72) Inventors: Peter Winzell, Mountain View, CA (US); Jon Seneger, Monte Sereno, CA (US)

(73) Assignee: Volvo Car Corporation, Gothenburg (SE)

( * ) Notice: Subject to any disclaimer, the term of this patent is extended or adjusted under 35 U.S.C. 154(b) by 132 days.

(21) Appl. No.: 18/299,920

(22) Filed: Apr. 13, 2023

(65) Prior Publication Data

US 2024/0345650 A1   Oct. 17, 2024

(51) Int. Cl.
| | |
|---|---|
| *G08B 21/00* | (2006.01) |
| *G01S 19/42* | (2010.01) |
| *G06F 3/01* | (2006.01) |
| *G10K 11/175* | (2006.01) |

(52) U.S. Cl.
CPC .............. *G06F 3/011* (2013.01); *G01S 19/42* (2013.01); *G10K 11/1752* (2020.05); *G06F 2203/011* (2013.01)

(58) Field of Classification Search
CPC .... G06F 3/011; G06F 2203/011; G01S 19/42; G10K 11/1752
See application file for complete search history.

(56) References Cited

U.S. PATENT DOCUMENTS

| | | | | |
|---|---|---|---|---|
| 2019/0214037 | A1* | 7/2019 | Hori | G06F 40/237 |
| 2019/0243459 | A1* | 8/2019 | Imaizumi | G06F 3/012 |
| 2022/0004360 | A1* | 1/2022 | Carman | G10L 25/51 |
| 2022/0207081 | A1* | 6/2022 | Ding | G06V 20/56 |
| 2022/0355814 | A1* | 11/2022 | Sharifi | G01C 21/3697 |
| 2024/0025416 | A1* | 1/2024 | Seneger | B60W 40/08 |

\* cited by examiner

*Primary Examiner* — Toan N Pham
(74) *Attorney, Agent, or Firm* — Amin, Turocy & Watson, LLP

(57) ABSTRACT

Various systems and methods are presented regarding utilizing technology to determine a vehicle occupant's reaction to a soundscape present in a passenger compartment in which they are located. Sound waves present in the soundscape can result for sources internal and external to the vehicle, as well as sound waves transmitted into the passenger compartment as part of an audio technique, such as audio suppression, audio enhancement, anti-noise, audio cancellation, etc. Occupant feedback can be via a button, gesture recognition, speech, a physical condition, and suchlike, and can indicate approval or disapproval of the soundscape. Location of the vehicle can be determined based on GPS data, images of the operating environment, etc. The network of devices can be clocked with a common protocol to enable synchronization of fused data.

20 Claims, 10 Drawing Sheets

VEHICLE AUDIO SENSOR FUSION AND OCCUPANT FEEDBACK SYSTEM

TECHNICAL FIELD

This application relates to capturing response of a vehicle occupant to an audio effect experienced in a passenger compartment.

BACKGROUND

A fundamental aspect of traveling in a vehicle is the audible environment experienced by one or more occupants in the vehicle passenger compartment/cabin. A person can play music, listen to a podcast, and suchlike, however, given the randomness of sounds generated by the vehicle as well as those signals generated by the operating environment, e.g., road noise, other vehicles, etc., unanticipated/unwanted noise can affect the occupant's mood and/or attention.

Dynamic noise can be generated by the tires hitting the road surface, a nearby siren, a passing vehicle, and suchlike. Static noise can be the white/continuous/recurring noise generated by an onboard system, e.g., a climate control system to maintain the operating environment of the passenger compartment.

Vehicle-based audio systems have the technology to change the audio soundscape experienced by an occupant(s) within a passenger compartment. Various audio suppression/enhancement techniques can be delivered via speakers located in the passenger compartment (e.g., door mounted, and suchlike). Audio technologies developed for wearables (e.g., earbuds, in-ear headphones) are finding application in the automotive environment to enhance the driving experience.

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the summary is to present some concepts in a simplified form as a prelude to the more detailed description presented herein.

In one or more embodiments described herein, systems, devices, computer-implemented methods, methods, apparatus and/or computer program products are presented to detect a reaction to one or more sounds, wherein the one or more sounds are present in a vehicle passenger compartment.

According to one or more embodiments, a system can be located on a vehicle, The system can comprise a memory that stores computer executable components and a processor that executes the computer executable components stored in the memory. The computer executable components can comprise an occupant reaction component configured to detect and record a reaction to a soundscape. In another embodiment, the computer executable components can further comprise a dataset generator component configured to compile a dataset, wherein the dataset can comprise a soundscape formed from at least one of a first sound, a second sound, or a third sound, and further, the recorded reaction, wherein the reaction indicates whether the soundscape is approved or rejected. In an embodiment, the occupant reaction component can comprise a switch, a facial recognition sensor, a motion sensor, a speech sensor, or a physical condition sensor. Further, wherein the soundscape is present in a passenger compartment of the vehicle. In an embodiment, the first sound wave can be a sound present during operation of the vehicle.

In a further embodiment, the computer executable components can further comprise a sound generator configured to generate the second sound wave, wherein the second sound wave can be generated to suppress or enhance the first sound wave, and the third sound wave can be formed due to an interaction between the first sound wave and the second sound wave.

In another embodiment, the dataset can further comprise global positioning system data indicating a location of the vehicle when the reaction was detected. The dataset can further comprise at least one digital image generated at a time when the reaction was detected, wherein the at least one digital image can be created by a camera onboard the vehicle. The dataset can further comprise vehicle data, wherein the vehicle data can comprise at least one of velocity data, acceleration data, deceleration data, or braking data generated when the reaction was detected.

In an embodiment, the computer executable components can further comprise a clock component, wherein the clock can be configured to operate according to a network time protocol (NTP), and wherein operation of the occupant reaction component and operation of the dataset generator component are synchronized based on the clock.

In other embodiments, elements described in connection with the disclosed systems can be embodied in different forms such as computer-implemented methods, computer program products, or other forms. For example, in an embodiment, a computer-implemented method can be performed by a device operatively coupled to a processor, wherein the device can be located on a vehicle. In an embodiment, the method can comprise: compiling, by a device comprising a processor located on a vehicle, a dataset, wherein the dataset comprises a soundscape formed from at least one of a first sound, a second sound, or a third sound; detecting, by the device, a reaction from an occupant of the vehicle, wherein the reaction is in response to at least one of the first sound, the second sound, or the third sound; and further supplementing, by the device, the dataset with the detected reaction.

In an embodiment, the soundscape is present in a passenger compartment of the vehicle and the occupant is located in the passenger compartment. In a further embodiment, the reaction can be detected by a switch, a facial recognition sensor, a motion sensor, a speech sensor, or an occupant physical condition sensor.

In another embodiment, the method can further comprise generating, by the device, the second sound wave to suppress or enhance the first sound wave, wherein the third sound wave is formed from an interaction between the first sound wave and the second sound wave. In another embodiment, the method can further comprise supplementing, by the device, the dataset with at least one of global positioning system (GPS) data indicating a location of the vehicle at the time the reaction was detected or at least one digital image depicting a location of the vehicle at the time the reaction was detected.

Further embodiments can include a computer program product comprising a computer readable storage medium having program instructions embodied therewith, the program instructions executable by a processor, located on a vehicle, can cause the processor to compile, by a device comprising a processor located on the vehicle, a dataset, wherein the dataset comprises a soundscape formed from at least one of a first sound, a second sound, or a third sound; further detect a reaction from an occupant of the vehicle, wherein the reaction is in response to at least one of the first sound, the second sound, or the third sound; and further supplement the dataset with the detected reaction.

In an embodiment, the soundscape can be present in a passenger compartment of the vehicle and the occupant is located in the passenger compartment. In another embodiment, the reaction can be detected by a switch, a facial recognition sensor, a motion sensor, a speech sensor, or an occupant physical condition sensor.

In another embodiment, the program instructions are further executable by the processor to cause the processor to generate the second sound wave to suppress or enhance the first sound wave, wherein the third sound wave is formed from an interaction between the first sound wave and the second sound wave. In another embodiment, the program instructions are further executable by the processor to supplement the dataset with at least one of global positioning system (GPS) data indicating a location of the vehicle at the time the reaction was detected or at least one digital image depicting a location of the vehicle at the time the reaction was detected.

An advantage of the one or more systems, computer-implemented methods, and/or computer program products can be utilizing various systems and technologies located on a vehicle to determine whether an occupant onboard the vehicle approves or disapproves of a soundscape, wherein the soundscape can be generated as a function of noise suppression, noise enhancement, anti-noise, and suchlike.

DESCRIPTION OF THE DRAWINGS

One or more embodiments are described below in the Detailed Description section with reference to the following drawings.

DETAILED DESCRIPTION

Figure 1:
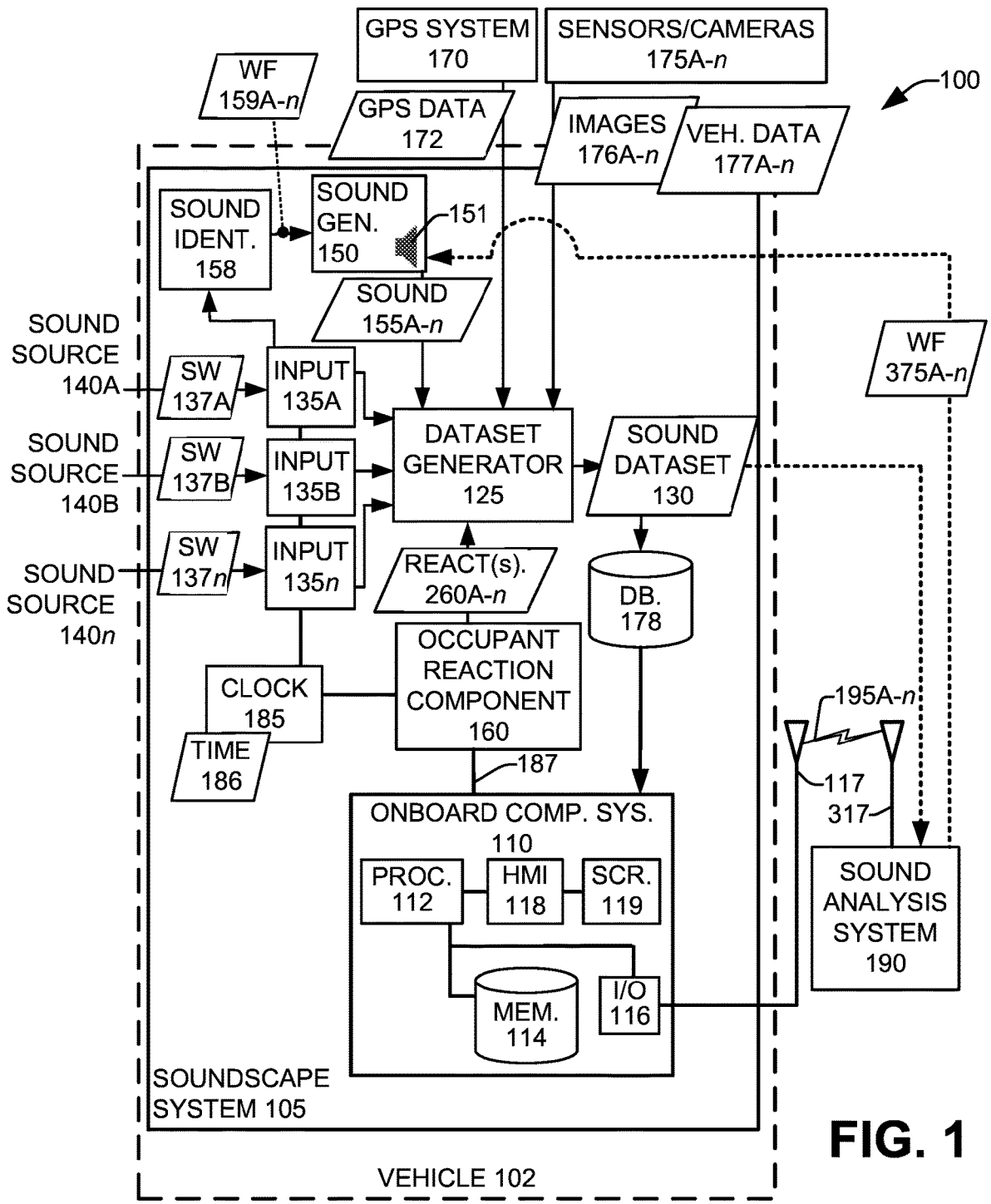
FIG. 1 presents a system configured to monitor how one or more sounds influence a soundscape present in a vehicle passenger compartment and further identify a vehicle occupant's response to the one or more sounds, in accordance with at least one embodiment.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

As used herein, "data" can comprise metadata. Further, ranges A-n are utilized herein to indicate a respective plurality of devices, components, signals etc., where n is any positive integer.

In the various embodiments presented herein, the disclosed subject matter can be directed to identifying an occupant's response to a sound effect/audio effect being present in the passenger compartment of a vehicle. The terms audio, noise, sound, and suchlike, are used interchangeably. Further, the terms sound waves and waveforms are used interchangeably herein, wherein they can both convey a sound wave passing through a space and a waveform depiction of the sound wave.

Onboard audio systems can provide technology to change the audio soundscape experienced by an occupant(s) within a passenger compartment. Various noise suppression/enhancement techniques can be delivered from speakers (e.g., dashboard mounted, door mounted, headrest mounted, and suchlike) or via wearables (e.g., in-ear headphones).

Per the various embodiments, use of spatial audio and audio zones within the passenger compartment enables delivery of a currently present soundscape and further apply an audio variation (e.g., inject new audio/sounds) to the soundscape for the occupant to experience. The various embodiments presented herein enable the presence/creation of different soundscapes within a passenger compartment to be controlled and assessed, and further, to monitor reaction of an occupant to a particular noise. The noise of interest can be random noise generated during normal day-to-day operation of the vehicle, e.g., the vehicle soundscape is controlled and/or monitored while the vehicle is operating on city streets, on a highway, on a country lane, on a test track, parked at a shopping mall, etc. Further, the sound of interest can be a sound applied to the soundscape, for example, to assess an occupant's response to a particular audio technique applied to the soundscape. For example, to increase an occupant's awareness of an emergency vehicle approaching the vehicle, the soundwave received from the emergency vehicle can be enhanced to enable the occupant to prepare to pullover to let the emergency vehicle pass (e.g., a waveform from the emergency vehicle siren is increased in volume while the emergency vehicle is further away and the siren is readily discernible), whereby, the response of the occupant to the audio enhancement can be assessed. The various embodiments herein present systems and technology for fusion of occupant sensory input and their reaction to various audio recordings and vehicle signals/noise.

Fusion data sets can be compiled (e.g., from the multitude of audio/sound sources within a vehicle) in conjunction with analysis of occupant reaction and behavior to the various sounds present. For example, occupant reaction and behavior can be analyzed when exposed to new/novel audio technology.

Of concern is synchronizing the presence of the various sound sources with the response of the occupant. To enable meaningful analysis, it can be important to correlate a sound being present at the vehicle and the occupant's immediate response to that sound. For example, while operating a vehicle on a city, a multitude of sound sources are present, often in close temporal proximity to each other. Hence, in a series of audio triggers, it is important to be able to ascribe a particular response of the occupant to a particular audio event within the series of audio events. Accordingly, system delay/latency with regard to capturing an occupant response to a particular audio event should be minimized. Occupant feedback/response can be captured by the occupant activating a switch through to computer-implemented analysis, e.g., facial/posture recognition. Utilizing such systems as infra-red signal/transmission technology can minimize transmission lag between an occupant sensory signal and the compiled fusion data set.

The actual response time can be dependent on the occupant sensor which triggers generation of the infra-red signal received by the fusion recording system. Hence, the monitoring system and associated solution should be independent of/agnostic to the occupant sensor trigger, it can be ubiquitous to the occupant, or it can be an occupant active feedback trigger. The sensor can be a threshold controlled pulse sensor through to movement controlled. Examples of an active feedback trigger can be eye tracking or a simple button press in response to an instruction to express feedback.

In an embodiment, to minimize latency, an infra-red-based system can be configured such that an infra-red switch (trigger) can be combined with a receiver component configured to receive the infra-red trigger and further configured to translate the observation into a vehicle signal and write the observation to the vehicle network/bus. Audio recording, e.g., of the ambient noise/audio trigger, present in the soundscape can be performed in parallel, whereby a system clock is commonly applied to all of the respective components in the audio-enhancement system to enable all the parallel streams of data, recordings and observations regarding the response of the occupant to be timestamped with a common clocking protocol.

In an embodiment, the data, recordings, occupant reaction(s), observations, etc., (e.g., comprising a fused dataset) can be stored locally at the vehicle, with data analysis performed utilizing a sound analysis system at the vehicle. In another embodiment, the fused dataset can be transmitted to a remote sound analysis system (e.g., a cloud-based system) for near real time observation of the soundscape.

In another embodiment, a reaction component can be configured to capture the occupant's reaction, record the reaction occurring, and further utilize the reaction as a trigger to initiate/enable subsequent monitoring. Alternatively, the reaction component can be configured to capture the occupant's reaction and further translate the trigger into a vehicle signal for inclusion into the fused dataset, add to a database, and further write the reaction trigger to the vehicle network. In an event of the latter, the audio signal can become part of the audio and signal data set (e.g., the fused dataset).

As mentioned, in an embodiment, the vehicle-based soundscape system can be in communication with a cloud-based system enabling transfer of the fused dataset, audio triggers, reactions, etc., from the vehicle to a monitoring system, with subsequent adjustments/enhancements configured at the remote monitoring system and delivered to the vehicle-based soundscape system. By utilizing a cloud connection, it is possible to monitor the data set and induce changes in response to the occupant reaction by writing to the vehicle-based components from the cloud-based system. For example, a first audio effect present in the soundscape of the passenger compartment can be identified, e.g., based on audio analysis at the remote system. Further, a second audio effect can be identified to compliment the first audio effect, to create a third audio effect in the passenger compartment. The occupant's response to the third audio effect can be captured and analyzed to determine if the third audio effect has the occupant's approval or disapproval.

In the event of a multitude of sounds are present in the passenger compartment (whether originating from the vehicle/operating environment or a result of a sound being created and applied to the soundscape), one or more algorithms can be applied to determine a particular sound source that the occupant was reacting to, wherein the particular sound source can be isolated for further analysis.

Turning now to the drawings, FIG. 1 illustrates a system 100 configured to monitor how one or more sounds influence a soundscape present in a vehicle passenger compartment and further identify a vehicle occupant's response to the one or more sounds, in accordance with at least one embodiment. System 100 comprises a vehicle 102 with a soundscape system 105 located thereon. In an embodiment, soundscape system 105 can comprise various devices/components, such as an onboard computer system (OCS) 110. In an embodiment, the soundscape system 105 can be a stand-alone system located on vehicle 102 such that OCS 110 is dedicated to operation of soundscape system 105, with OCS 110 directly coupled to the soundscape system 105. Alternatively, in an embodiment, OCS 110 can be a vehicle control unit (VCU) to which the soundscape system 105 is operatively coupled. When operating as the VCU, the OCS 110 can also be utilized to provide overall operational control and/or operation of vehicle 102.

As shown in FIG. 1, the soundscape system 105 can include a dataset generator component 125. In an embodiment, the dataset generator component 125 can be configured to function as a fusion component configured to combine multiple sound waves, reactions, signals, sources, inputs, data, and suchlike as further described.

A series of devices and sensors 135A-n (aka, input sensors) can be utilized to capture sounds 137A-n, vibrations, and suchlike from multiple sound sources 140A-n. The devices and sensors 135A-n can comprise any device suitable for capturing the various sources 140A-n, causes, and generators of noise and sounds 137A-n present in the passenger compartment as well as the sound waves 137A-n forming the respective noises. Devices and sensors 135A-n can include one or more microphones configured to capture sound waves 137A-n present in a passenger compartment of vehicle 102. Alternatively, devices and sensors 135A-n can include vibration sensors, motion sensors, and suchlike, configured to capture vibrations and other sources of sound waves 137A-n.

Figure 2:
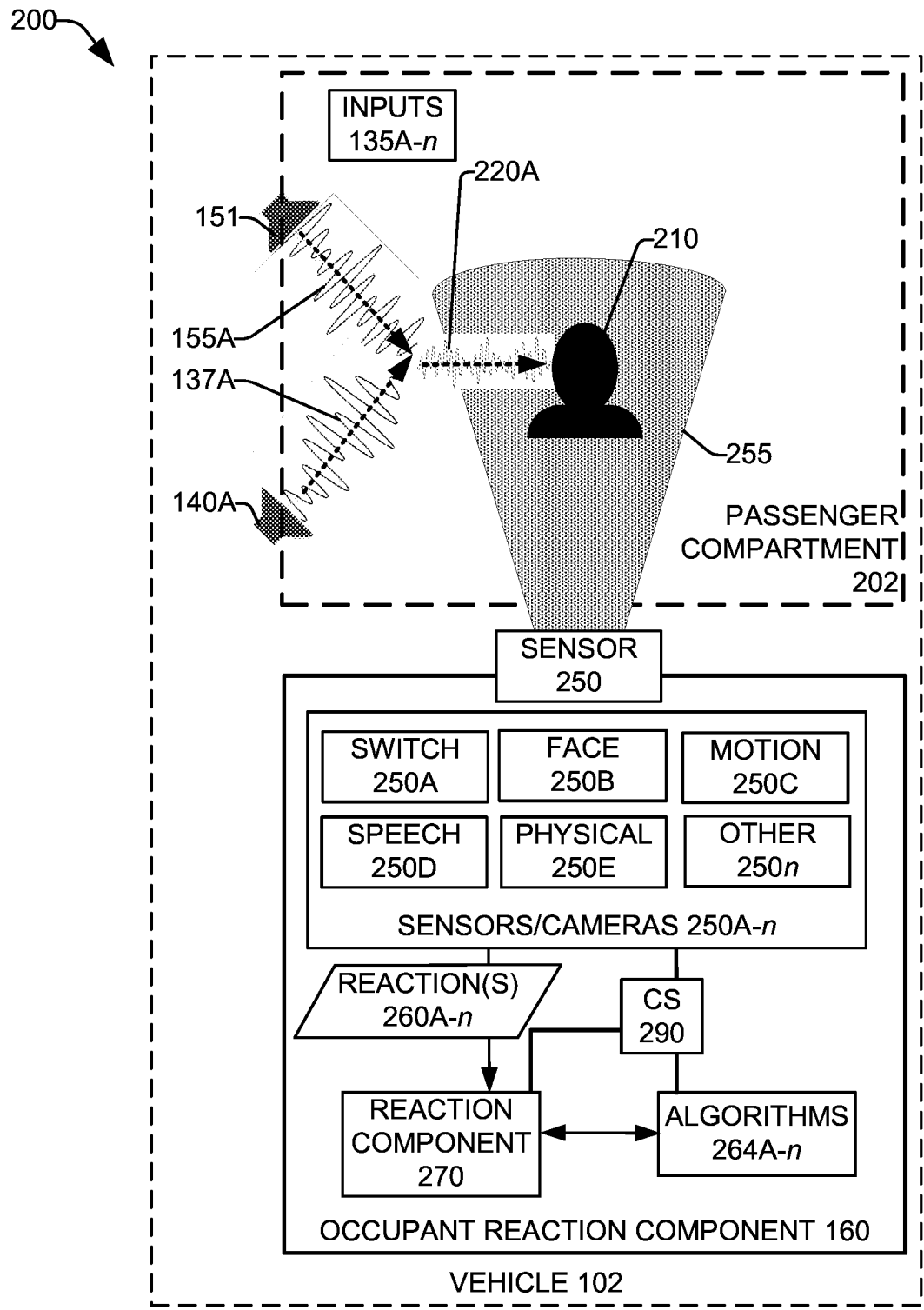
FIG. 2 is a system diagram providing a further detailed view of a system configured to determine a reaction to a soundscape, in accordance with one or more embodiments.

The sound waves 137A-n can be generated by any respective sound source 140A-n encountered during operation of vehicle 102, wherein respective sources can, in a non-limiting list, include, (a) noise generated by one or more occupants of the passenger compartment of vehicle 102, (b) one or more devices/objects in the possession of the one or more occupants in the passenger compartment, wherein the one or more devices can include a cellphone, a smart device, a tablet computer, a toy, food packaging, a person eating popcorn, and suchlike, (c) an audio device incorporated into the vehicle 102, such as a music system, an audiovisual system (e.g., a HMI/display), a navigation system (e.g., providing voice-driven navigation), and suchlike, (d) a device or system involved in the operation of vehicle 102 such as an engine/motor, an acceleration system, a braking system, motors and suchlike configured to open/close door windows/sunroof, wheels and tires, the suspension system, a passenger compartment climate control system, and suchlike, (e) any external noise source such as the road surface on which vehicle 102 is traveling (e.g., road noise generated by the interaction of the tires/wheels with the road surface), wind noise generated by the passage of vehicle 102 through the operating environment, weather noise such as wind, rain, hail, etc., incident on vehicle 102, noise generated by nearby vehicles, noise generated by pedestrians, noise generated by a nearby industrial/manufacturing plant, aircraft noise, railroad noise, wildlife noise, and suchlike, and/or (f) anything generating noise/sound waves 137A-n present in the passenger compartment (e.g., passenger compartment 202, per FIG. 2) of vehicle 102, regardless of whether the noise/sound waves 137A-n are wanted or unwanted to be experienced by the occupant (e.g., occupant 210, per FIG. 2). Accordingly, signals generated by the input devices and sensors 135A-n can be transmitted and input into the dataset generator component 125.

Further, another source of sound waves or sound effects can be a sound generator component (SGC) 150. SGC 150 can include a speaker or similar audio device configured to generate a sound wave 155A-n which can be input into/received by the dataset generator component 125. The sound waves 155A-n applied to the soundscape can also be captured by one or more of the inputs 135A-n, in a comparable manner to the capturing of sound waves 137A-n. Accordingly, when the only sounds present in the passenger compartment are being generated by sound sources 140A-n, sensors 135A-n would capture the sound waves 137A-n in their naturally occurring state. However, when sound wave(s) 155A-n are also generated by SGC 150, the sound wave(s) 155A-n can affect the waveforms of sound waves 137A-n, causing an alteration of the waveforms of sound waves 137A-n from an original state to an altered state (e.g., sound waves 220A-n, per FIG. 2), wherein the altered waveforms of sound waves 137A-n can be captured by the sensors 135A-n. Sound waves 155A-n can be generated by SGC 150 to encompass any noise control technology, e.g., active noise control, anti-noise, noise suppression, noise cancellation, noise reduction, audio enhancement, and suchlike. Various soundwaves 155A-n can be generated by SGC 150 to achieve a desired effect, wherein the desired effect may be, for example, to apply a first sound wave 155A to suppress a second sound wave 137A generated by sound source 140A.

In an example application, to increase an occupant's awareness of an emergency vehicle approaching vehicle 102, the soundwave 137B received at vehicle 102 from the emergency vehicle 140B can be captured (e.g., by inputs 135A-n) and enhanced/increased in volume by application of soundwave 155B, wherein the first sound wave 137B and the second sound wave 155B undergo constructive interference to enhance the loudness of the first sound wave 137B in an attempt to ensure an occupant of vehicle 102 is aware of an emergency vehicle approaching such that the occupant can be prepared for the impending approach of the emergency vehicle and take appropriate action, e.g., pull over to allow the emergency vehicle to pass. Any interaction of sound waves 155A-n with the various sound waves 137A-n can be conducted, e.g., a single wave 155D is applied to cause an audio effect upon a collection of sound waves 137A-n, or a number of sound waves 155A-n can be applied, per various audio, sound, and noise techniques/technologies available to meet a requirement of noise experienced by an occupant of the passenger compartment of vehicle 102.

Soundscape system 105 can further include a sound identification component 158 configured to analyze the respective sound waves 137A-n in conjunction with the sensor inputs 135A-n to identify a sound source 140A-n of the sound waves 137A-n. The sound identification component 158 can be further configured to determine one or more wave forms 159A-n that can be generated to suppress, enhance, etc., one or more sound events present in the respective sound waves 137A-n. The waveforms 159A-n can be supplied to SGC 150, wherein the SGC 150 can be configured to (i) generate a sound wave 155A-n based on the supplied waveform 159A-n, (ii) utilize the waveform 159A-n to modify a waveform 375A-n (e.g., received from the sound analysis system 190) from which a sound wave 155A-n is generated and transmitted from SGC 150 (e.g., via a speaker included in the SGC 150, not shown), and suchlike.

To assist in the operation of SGC 150 and the generation of sound waves 155A-n, an occupant reaction component (ORC) 160 can be configured to obtain feedback from the occupant as they experience the effect of the sound waves 155A-n upon the soundscape of the passenger compartment of vehicle 102. Hence, as sound waves 155A-n are generated to affect/enhance sound waves 137A-n that are present during operation of vehicle 102, an occupant can indicate whether they deem the effect of the sound waves 155A-n (e.g., in affecting sound waves 137A-n) is pleasant or unpleasant to the car, for example.

Turning momentarily to FIG. 2, system 200 presents a further detailed view of the ORC 160, in accordance with one or more embodiments. As mentioned, in an embodiment, an occupant 210 can provide feedback regarding the effect of applying any of the soundwaves 155A-n to the soundscape of the passenger compartment 202. In another embodiment, a reaction of occupant 210 to a sound can be observed/determined/captured by a sensor 250A-n. As shown, a second sound wave 155A generated by speaker 151 of the SGC 150 is being applied to a first sound wave 137A generated by sound source 140A, wherein the first sound wave 137A and the second sound wave 155A combine to create a third sound wave 220A, wherein the second sound wave 155A can be generated to achieve suppression, enhancement, anti-noise, etc., of the first sound wave 137A (e.g., constructive interference, destructive interference, etc.). The third sound wave 220A (e.g., the result of application of the second sound wave 155A on the soundscape, depicted by sound wave 137A, of the passenger compartment 202 of vehicle 102) is experienced/heard by the occupant 210. Various sensors and cameras 250A-n can be utilized to provide feedback from and/or capture the response of occupant 210 to the effect of the second sound wave 155A interacting with the first sound wave 137A to create the resulting soundscape represented by sound wave 220A. In an embodiment, the first sound wave 137A, the second sound wave 155A-n, and the third sound wave 220A-n can be captured/recorded by the inputs 135A-n.

In the schematic presented in FIG. 2, a sensor 250 is shown interacting with the occupant 210, wherein sensor 250 can comprise any of the sensors 250A-n as further described, and further, more than one sensor 250 can be present and operating in the passenger compartment 202 at any moment.

In an embodiment, sensor 250 can be a binary switch 250A (e.g., with YES/NO buttons, red/green buttons), wherein the occupant 210 activates the switch 250A to record approval (position of binary switch 250A is 1) or disapproval (position of binary switch 250A is 0). However, the interaction of occupant 210 with switch 250A may have inherent latency, e.g., due to the physical operation of reaching for the switch 250A and activating it, as well as transmission of the operating signal between the switch 250A and a receiver (e.g., reaction component 270), wherein the transmission can be minimized by utilizing infra-red transmission. Further, switch 250A requires physical interaction to operate, which may cause a focus of attention of occupant 210 to be interrupted as they operate switch 250A.

Other sensors/cameras 250A-n can be "hands-free", such as a face/facial recognition sensor 250B configured to capture a facial expression and/or a change in facial expression of occupant 210 in response to the second sound wave 155A interacting with the first sound wave 137A to create the resulting soundscape represented by sound wave 220A. For example, when exposed to a pleasing soundscape generated by sound wave 220A, occupant 210's face may not change or they may smile, or suchlike, while when exposed to a displeasing soundscape generated by sound wave 220A, occupant 210's face may change to a grimace. In an embodiment, the face sensor 250B can include an eye sensor configured to capture eyeball/eyelid motion of occupant 210, wherein the motion of the eyeball (e.g., oscillation) and/or the eyelids can be captured, as occupant 210 stares or alternatively blinks rapidly in response to the presence of any of an unexpected/agreeable/disagreeable sound wave 220A.

Sensors/cameras 250A-n can also include a motion detection sensor 250C configured to capture a motion of occupant 210 to the effect of the second sound wave 155A interacting with the first sound wave 137A to create the resulting soundscape represented by sound wave 220A. For example, when exposed to a pleasing soundscape generated by sound wave 220A, motion detection sensor 250C may detect occupant 210 nodding their head or raising their hand in an approving manner, while when exposed to a displeasing soundscape generated by sound wave 220A, motion detection sensor 250C may detect occupant 210 nodding their head or raising their hand in a disapproving manner.

Given their respective operation, face/facial recognition sensor 250B and motion detection sensor 250C may include a camera configured to capture occupant 210's face, body movement, etc., in the field of view 255 of the camera.

Sensors/cameras 250A-n can also include a speech sensor 250D configured to capture a word, phrase, utterance, guttural sound, and suchlike, conveyed by occupant 210 in response to the effect of the second sound wave 155A interacting with the first sound wave 137A to create the resulting soundscape represented by sound wave 220A. Speech sensor 250D can be any suitable device, e.g., a microphone. For example, when exposed to an agreeable soundscape generated by sound wave 220A, speech sensor 250D may detect occupant 210 making an affirmative statement such as "YES", while when exposed to a displeasing soundscape generated by sound wave 220A, speech sensor 250D may detect occupant 210 uttering a negative statement "NO" or a sound from which it can be inferred that the occupant 210 is not in an approving state of mind.

Sensors/cameras 250A-n can also include a physical condition sensor 250E configured to detect a change in the physical condition of occupant 210 in response to the effect of the second sound wave 155A interacting with the first sound wave 137A to create the resulting soundscape represented by sound wave 220A. For example, occupant 210 may experience stress as the soundscape transitions from an agreeable sound to a disagreeable sound, with an accompanying increase in heart rate, which is detected by physical condition sensor 250E. In an embodiment, the physical condition sensor 250E can be located in a seat in which the occupant 210 is sitting. In another embodiment, the physical condition sensor 250E can be operating on a smartwatch, or similar device, worn by the occupant 210, with the physical condition sensor 250E configured to receive a signal comprising a heart rate, or similar measure, transmitted from the smartwatch.

It is to be appreciated that any sensor 250n can be utilized with the various embodiments presented here to capture a change in state of the occupant 210 resulting from the soundscape of passenger compartment 202 transitioning from an agreeable sound to a disagreeable sound, and vice-versa. Further, one or more sensors 250A-n can be operating concurrently.

The ORC 160 can further include a reaction component 270 configured to capture the respective output (reactions 260A-n) of the sensor 250A-n, and further configured to transmit the respective output (reactions 260A-n) into the dataset generator component 125. The reaction component 270 can be configured to operate in conjunction with various algorithms 264A-n respectively configured/trained to determine information, make predictions, classify entities, etc., regarding reactions 260A-n by occupant 210 to a variation in the soundscape of the passenger compartment 202. Algorithms 264A-n can be configured to provide artificial intelligence (AI) to the various sensors 250A-n included in the ORC 160, and, in a non-limiting list, can include a computer vision algorithm(s), a digital imagery algorithm(s), position prediction, velocity prediction, direction prediction, wave form analysis, and suchlike, to enable the respective determinations, predictions, etc., to be achieved, per the various embodiments presented herein. Digital images, data, and the like generated by sensors/cameras 175A-n can be analyzed by algorithms 264A-n to identify respective features of interest such as a sound source 140A-n, other vehicles (e.g., parked in the vicinity of vehicle 102), lane markings, etc. In an embodiment, a camera 175A can capture visual data from the environment/surroundings, while a sensor 175B can operate based upon transmission of transmission and reflection of a signal (e.g., an infra-red (IR) signal), per detection beam(s) 255.

As previously mentioned, in an embodiment, the respective sensors/cameras 250A-n and components (e.g., reaction component 270) included in the ORC 160 can utilize the respective processor, memory, etc., included in OCS 110, or the respective sensors/cameras 250A-n and components (e.g., reaction component 270) included in the ORC 160 can utilize a computer system 290 comparable and comprising comparable components to those in OCS 110, e.g., a processor 212, a memory 214, and I/O component 216, and suchlike.

As shown in FIG. 2, various input sensors 135A-n are located in or proximate to the passenger compartment 202, wherein, as previously mentioned, the input sensors 135A-n can be configured to detect the sound waves 137A-n, 155A-n, and 220A-n, and convert the waves to an electrical signal/waveform to be input into the dataset generator component 125. The dataset generator component 125 can be further configured to supplement a sound dataset 130 with the respective sound waves 137A-n, 155A-n, and 220A-n and their waveform representations, and further configured to transmit the sound dataset 130 to the sound analysis system 190 (e.g., for receipt by the dataset receive/store component 305.

It is to be appreciated that while FIG. 2 depicts a single occupant 210 providing feedback to the soundscape, more than one occupant 210A-n can be present in the passenger compartment 202, such that reactions 260A-n can be determined for each of the occupants 210A-n. Accordingly, when, for example, audio technology is being developed with the intent to create respective audio zones within the passenger compartment, the success of the technique can be determined based on, for example, the respective reaction 260A-n of the respective occupant 210A-n, e.g., with regard to their seat location/position within the passenger compartment.

Returning to FIG. 1, in another embodiment, a further input to the dataset generator component 125 can be Global Positioning System (GPS) data 172 received from GPS system 170. GPS system 170 can provide location information regarding a location of vehicle 102 at the time that any of sound waves 137A-n, 155A-n, and/or 220A-n, were generated, wherein GPS data 172 can include the location expressed as latitude, longitude, and altitude, and further, a time at which the GPS data 172 was obtained from the GPS system 170. While the term GPS is utilized herein, any suitable navigation/location system can be utilized such as any of a global navigation satellite system (GNSS), GPS, Europe's GALILEO system, Global Navigation Satellite System (GLONASS), BEIDOU Navigation Satellite System, Quasi-Zenith Satellite System (QZSS), an autonomous geo-spatial positioning system, or a satellite-based positioning, navigation and timing (PNT) system, and suchlike. Systems currently being developed/released to market enable location of vehicle 102 to be determined with an accuracy of centimeters rather than meters, wherein location-accurate data from such current and future systems can be utilized as location data of vehicle 102.

Location data such as GPS data 172 can be utilized to identify a location and operating conditions (e.g., weather, wind speed, surrounding noise, and suchlike) of vehicle 102. For example, in an embodiment, rather than the reaction 260A-n of the occupant 210 being assessed with regard to a combination of sound waves 137A-n and 155A-n, the reaction 260A-n can be in response to an externally generated noise (e.g., creating only sound waves 137A-n) engendered by an operating environment of vehicle 102 can be analyzed with regard to occupant 210's reaction. An operating scenario may involve vehicle 102 driving along a road that includes a pothole. As vehicle 102 drives through the pothole, the resulting noise from the tire hitting the pothole can be considered to be a sound source 140P, such that noise from the pothole forms part/influences one or more of the sound waves 137A-n, and accordingly is picked up by one or more of the sensor inputs 135A-n. As part of analyzing occupant 210's reaction 260A-n, the GPS data 172 can be reviewed to determine where vehicle 102 was at the time that the one or more sound waves 137A-n were generated such that the location can be investigated and further studied regarding one or more sound sources 140A-n (e.g., pothole, speedbump, expansion joint in the road surface, nearby factory, railroad, airport, birdsong, and suchlike).

The soundscape system 105 can further include one or more sensors/cameras 175A-n which can be configured to capture information and data regarding operation of vehicle 102 and the operating environment. For example, one or more cameras 175A-n can capture imagery (e.g., images 176A-n) of the operational surroundings of a journey conducted by vehicle 102, e.g., during capture and/or generation of sound waves 137A-n. Images 176A-n (e.g., digital images) captured during the journey can supplement the GPS data 172, wherein the images 176A-n can be reviewed (e.g., by sound analysis system 190) to enable identification of one or more external sources 140A-n that may give rise to the one or more sound waves 137A-n, e.g., a pothole, speedbump, expansion joint in the road surface, factory sounds, etc. Further, sensors 175A-n can capture vehicle data 177A-n (e.g., acceleration, deceleration, speed, velocity, direction, wind noise, etc.) regarding operation of vehicle 102, such as motion sensors, accelerometers, brake sensor, wind speed, and such like. The sensors/cameras 175A-n can include any suitable detection/measuring device, including cameras, optical sensors, laser sensors, Light Detection and Ranging (LiDAR) sensors, sonar sensors, audiovisual sensors, perception sensors, road lane sensors, motion detectors, velocity sensors, and the like, as employed in such applications as simultaneous localization and mapping (SLAM), and other computer-based technologies and methods utilized to determine an environment being navigated by vehicle 102 and the location of the vehicle 102 within the environment (e.g., location mapping).

As mentioned, the dataset generator component 125 can be configured to receive the respective inputs and sound waves (e.g., sound waves 137A-n, 155A-n, and 220A-n, GPS data 172, images 176A-n, vehicle data 177A-n, reactions 260A-n, and suchlike), and further combine/fuse and process the respective inputs and sound waves to create a sound dataset 130, as further described herein. In an embodiment, the dataset generator component 125 can be configured to supplement an initial sound dataset 130 (e.g., comprising any of sound waves 137A-n, sound waves 155A-n, and/or sound waves 220A-n) with further sound waves as they are detected/received in the passenger compartment as well as with any GPS data 172, images 176A-n, vehicle data 177A-n, reactions 260A-n, and suchlike as the various information/data is received at the dataset generator component 125. Hence, over time (e.g., during operation of vehicle 102) the sound dataset 130 can comprise of a comprehensive volume of information and data, which can be subsequently analyzed to determine whether a soundscape is approved or rejected by an occupant of vehicle 102.

It is to be appreciated that the various embodiments presented herein relate to sound/analysis of any pertinent situation, e.g., a sound/audio effect present in the sound waves 137A-n arising from situational/sound sources 140A-n, the sound waves 155A-n applied by SGC 150, and sound waves 220A-n created by interaction of sound waves 137A-n and sound waves 155A-n in the passenger compartment 202, and suchlike.

To enable meaningful analysis of the respective sound waves 137A-n, 155A-n, and 220A-n, the reaction(s) of one or more occupants 210A-n, the sound wave source (e.g., as identified by GPS data 172 and images 176A-n), and suchlike, the ability to accurately cross-reference/synchronize the respective data/information with regard to an audible event and reaction thereto, all of the respective components, sound waves, information can be clocked to a common source. In an embodiment a clock 185 can be utilized to clock the respective components 135A-n, 150, 170, 175A-n, 125, 160, 250A-n, 270, captured sound waves 137A-n and 220A-n, generated sound waves 155A-n, received GPS data 172, and suchlike. Clock 185 can be any suitable component/device such as a clocking component utilizing Network Time Protocol (NTP) or similar technology, wherein the respective components form a network clocked based on clock 185.

As previously mentioned, of concern is to minimize latency between an audio event arising in the respective sound waves and occupant 210's reaction 260A-n to the audio event such that when respective events occur (e.g., a reaction 260A-n by occupant 210, as captured by reaction component 270, an audible effect is generated in soundwave 137F, an unwanted sound effect is present in sound wave 220A, and suchlike), when the respective event and when reaction 260A-n occurs thereto are to be accurately captured, whereby a lack of correlation between the event (e.g., sound wave 220A-n) and the response (e.g., reaction 260A-n) can arise due to system latency. Accordingly, the computer network/communication bus 187 utilized on the vehicle 102 should be as fast and as accurate as can be utilized as a vehicle-borne, embedded system, wherein such network/bus can be FLEXRAY, Controller Area Network (CAN), Ethernet, Local Interconnect Network (LIN), and suchlike. The bus 187 can communicatively couple OCS 110, dataset generator component 125, input sensors 135A-n, SGC 150, sound identification component 158, ORC 160, sensors/cameras 175A-n, and clock 185, such that the respective systems and components can be clocked with a timing sequence 186 based on the common time protocol.

The dataset generator component 125 can be configured to combine the various sound waves 137A-n, 155A-n, 220A-n, reactions 260A-n, inputs, etc., to generate a sound dataset 130. In an embodiment, the dataset generator component 125 can be configured to store the sound dataset 130 locally (e.g., in a database 178), for analysis at vehicle 102. The dataset generator component 125 can be further configured to transmit/provide the sound dataset 130 to an externally located system, such as the sound analysis system 190. In an embodiment, the sound analysis system 190 can be co-located on vehicle 102 or the sound analysis system 190 can be remotely located from vehicle 102 (e.g., sound analysis system 190 is a "cloud-based" computer system). The sound analysis system 190 can include various systems, components, artificial intelligence technology, and suchlike, to facilitate review of the sound dataset 130.

As shown in FIG. 1, the OCS 110 can further include a processor 112 and a memory 114, wherein the processor 112 can execute the various computer-executable components, functions, operations, etc., presented herein. The memory 114 can be utilized to store the various computer-executable components, functions, code, etc., as well as sound waves 137A-n, sound waves 155A-n, sound waves 220A-n, GPS data 172, reactions 260A-n, algorithms 264A-n, algorithms 364A-n, images 176A-n, vehicle data 177A-n, sound event 550, and suchlike regarding vehicle 102 (as further described herein). In an embodiment, the soundscape system 105 and the sound analysis system 190 can be respective standalone components communicatively coupled to the OCS 110. In another embodiment, the ORC 160 can be incorporated into the soundscape system 105 and utilize processor 112, memory 114, etc., of OCS 110. Alternatively, the ORC 160 can utilize a computer system 290 comprising similar components, e.g., processor, memory, etc., as utilized in OCS 110, as further described. In an alternative embodiment, the sound analysis system 190 can be a remote system and have incorporated therein a computer system 311, as further described.

As further shown, the OCS 110 can include an input/output (I/O) component 116, wherein the I/O component 116 can be a transceiver configured to enable transmission/receipt of sound dataset 130, sound waves 137A-n, 155A-n, 220A-n, GPS data 172, images 176A-n, vehicle data 177A-n, reactions 260A-n, etc., between the soundscape system 105 (including ORC 160) and any external system(s) (e.g., sound analysis system 190), e.g., a cellphone, a computer-based system, and suchlike. I/O component 116 can be communicatively coupled, via an antenna 117, to the remotely located devices and systems (e.g., sound analysis system 190). Transmission of data and information between the vehicle 102 (e.g., via antenna 117 and I/O component 116) and the remotely located devices and systems can be via the signals 195A-n. Any suitable technology can be utilized to enable the various embodiments presented herein, regarding transmission and receiving of signals 195A-n. Suitable technologies include BLUETOOTH®, cellular technology (e.g., 3G, 4G, 5G), internet technology, ethernet technology, ultra-wideband (UWB), DECAWAVE®, IEEE 802.15.4a standard-based technology, Wi-Fi technology, Radio Frequency Identification (RFID), Near Field Communication (NFC) radio technology, and the like.

In an embodiment, the OCS 110 can further include a human-machine interface (HMI) 118 (e.g., a display, a graphical-user interface (GUI)) which can be configured to present various information including sound dataset 130, sound waves 137A-n, 155A-n, 220A-n, GPS data 172, images 176A-n, vehicle data 177A-n, reactions 260A-n, and suchlike, regarding operation of vehicle 102, the sound waves encountered, and reactions 260A-n thereto, etc., per the various embodiments presented herein. The HMI 118 can include an interactive display 119 to present the various information via various screens presented thereon, and further configured to facilitate input of information/settings/etc., regarding operation of the vehicle 102.

Figure 3:
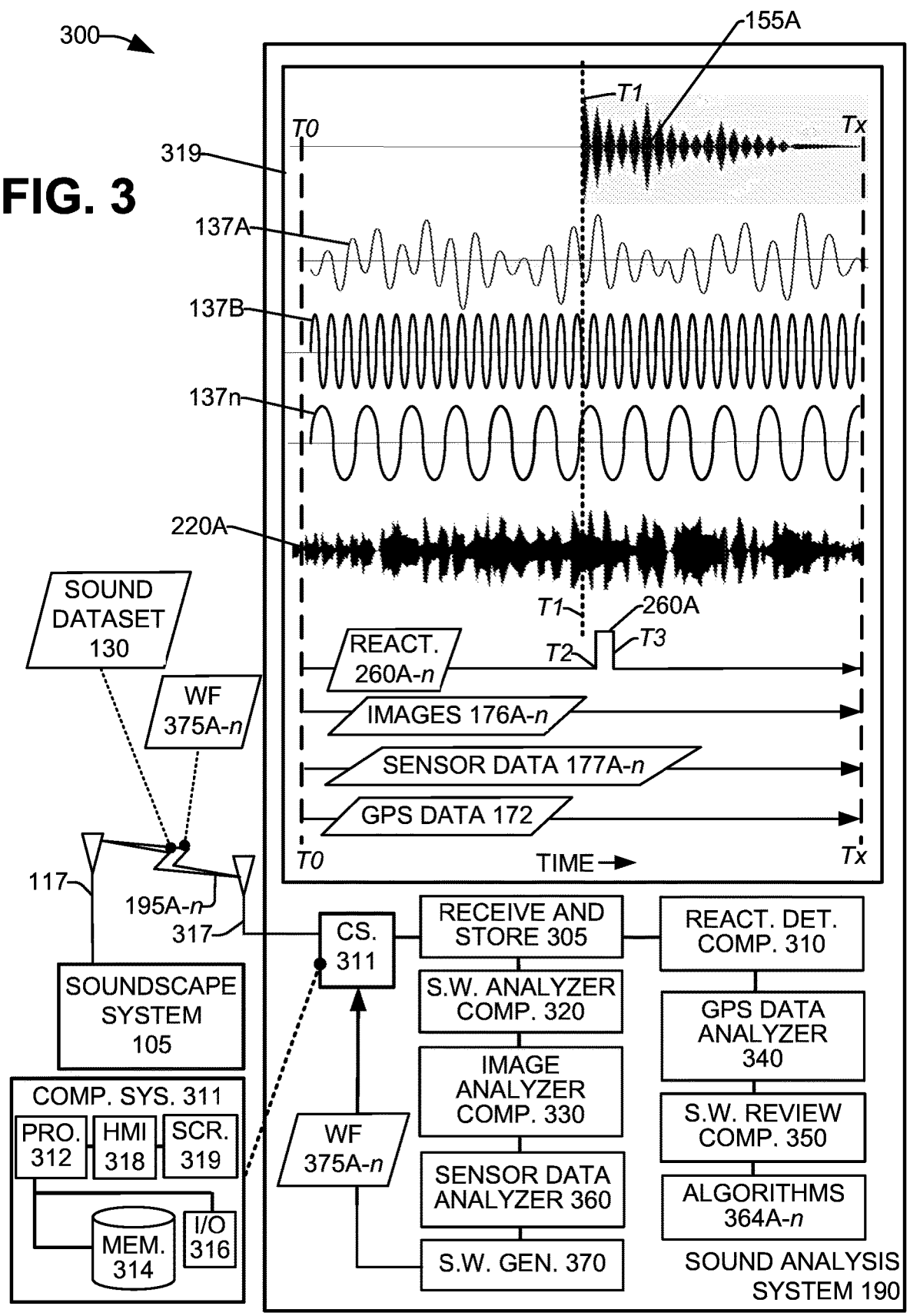
FIG. 3 is a system diagram of a sound analysis system configured to analyze various sound waves, GPS data, images, sensor data, and suchlike, in accordance with an occupant's response, according to one or more embodiments.

FIG. 3, system 300 presents a sound analysis system configured to analyze the various sound waves, GPS data, images, sensor data, and suchlike, in accordance with an occupant's response, according to one or more embodiments. As mentioned with reference to FIG. 1, sound analysis system 190 can be communicatively coupled to soundscape system 105, whereby the sound dataset 130 compiled at the soundscape system 105 (e.g., by the dataset generator component 125), and transmitted therefrom, can be received by, and processed at, sound analysis system 190. In an embodiment, the sound analysis system 190 can include a dataset receive component 305 configured to receive the sound dataset 130 (e.g., via I/O component 316 as signals 195A-n) and store the sound dataset 130 in the local memory 314, for subsequent analysis by one or more components included in the sound analysis system 190 (e.g., any of the reaction detection component (RDC) 310, sound wave analyzer component 320, image analyzer component 330, GPS data analyzer component 340, sound wave review component 350, sensor data analyzer 360, and suchlike. In an embodiment, HMI 318 and screen 319 (e.g., having functionally comparable to screen 119) can be configured to present the various information included in sound dataset 130. As shown, various sound waves 137A-n can be presented, along with the sound wave(s) 155A-n applied to, and sound waves 220A-n present in, the passenger compartment 202, in conjunction with any images 176A-n, vehicle data 177A-n, GPS data 172, and further the occupant's reaction data 260A-n. In an embodiment, the respective information can be presented as a time sequence/time line, wherein the data can be presented as an elapsed portion of time T0 (start time) to Tx (end time). The respective sound waves 137A-n are presented from time T0.

A previously mentioned, the sound wave 155A can be applied to the passenger compartment 202 at time T1. Owing to a small delay in reaction 260A, the occupant's reaction at T2 can be captured (e.g., by any of the sensors/cameras 250A-n). As shown, at T3 the occupant 210's reaction at 260A can subside (or be maintained in the case of the reaction sensor being a switch 250A), wherein the transition at T2/T3 can be identified by a reaction detection component (RDC) 310, and based thereon, further investigative analysis can be conducted to determine (in dataset 130) what caused the reaction 260A-n of the occupant 210 with regard to the respective sound waves 137A-n/155A-n, e.g., sound wave analyzer component 320 configured to analyze sound waves 137A-n and 155A-n in dataset 130, image analyzer component 330 configured to analyze images 176A-n in dataset 130, GPS data analyzer 340 configured to analyze GPS data 172 in dataset 130, sensor data analyzer 360 configured to analyze vehicle data 177A-n in dataset 130, and suchlike. In an embodiment, sound wave review component 350 can be configured to analyze respective sound waves 137A-n, 155A-n, and 220A-n in dataset 130, to determine any other new waveform that can be generated to achieve a given effect (e.g., suppression), wherein the new waveform 375A-n can be generated by sound wave generator 370 and transmitted to SGC 150 for conversion to/creation of a new sound wave 155A-n. The respective components 310, 320, 330, 340, 350, 360, and 370 can utilize any pertinent artificial intelligence (AI)/machine learning (ML) techniques, e.g., as provided in algorithms 364A-n, wherein algorithms 364A-n comprise similar functionality to algorithms 264A-n, as previously described.

As further show in FIG. 3, the sound analysis system 190 can further include a computing system 311 comprising comparable components to those in OCS 110, e.g., a processor 312, a memory 314, and I/O component 316, an antenna 317, a HMI 318, screen 319, and suchlike.

Figure 4:
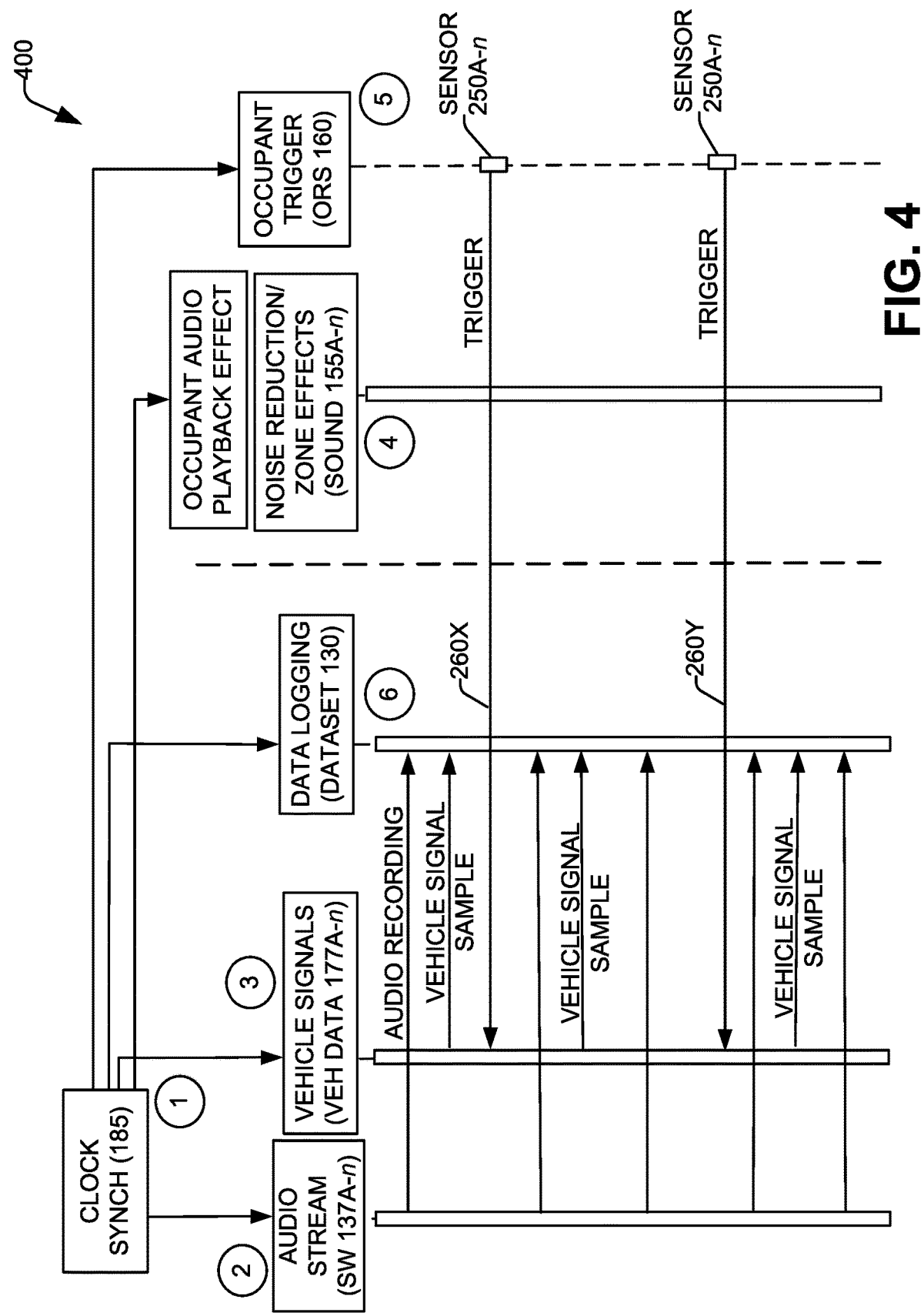
FIG. 4 presents a sequence diagram indicating respective operations performed during an occupant response to a sound, in accordance with an embodiment

FIG. 4 presents a sequence diagram 400 indicating respective operations performed during an occupant response to a sound, in accordance with an embodiment. Stepping through the sequence of events, at (1), the respective components, devices, systems incorporated into network 187 involved in the various embodiments presented herein, are clocked to a common clock 185 and timing sequence 186 utilizing any suitable technology enabling the respective components to synchronize, e.g., Network Time Protocol (NTP) or similar technology, as previously mentioned.

At (2), various sound waves 137A-n can be incident upon the passenger compartment 202, wherein the respective sound waves 137A-n can be captured by various sensors 135A-n (e.g., microphones). The respective sound waves 137A-n can be recorded and input into the dataset generator component 125 to form an initial portion of the sound dataset 130.

At (3), the vehicle data 177A-n can be captured from the various sensors and cameras 175A-n configured to monitor operation of vehicle 102. The respective vehicle data 177A-n can be recorded and inputted into the dataset generator component 125 to further form the sound dataset 130.

At (4), the sound waves 155A-n configured to create a given sound effect, noise reduction, zone effect, etc., can be introduced into the passenger compartment 202. An interaction between sound waves 155A-n and sound waves 137A-n can create the sound waves 220A-n, whereby sound waves 155A-n and sound waves 220A-n can be captured by various input sensors 135A-n and input into the dataset generator component 125 to further form the sound dataset 130.

At (5), the reaction(s) 260A-n of occupant 210 to the soundscape present in the passenger compartment 202, as depicted by sound waves 220A, can be captured by the one or more sensors 250A-n.

At (6), at any time during events (1)-(5), the respective data and configurations can be captured and compiled into a fusion of data to generate dataset 130. As previously described, dataset 130 can be analyzed to identify one or more events when the soundscape in passenger compartment 202 underwent a change (e.g., sound waves 155A-n influence sound waves 137A to form sound waves 220A-n).

As shown in FIG. 4, a sequence of interactions between sound waves 137A-n and 155A-n can occur to form respective sound waves 220A-n. For example, a reaction 260X can occur in response to sound waves 137X interacting with sound waves 155X to form a soundscape in the passenger compartment 202 including sound waves 220X, while a subsequent reaction 260Y can occur in response to sound waves 137Y interacting with sound waves 155Y to form a soundscape in the passenger compartment 202 including sound waves 220Y.

As used herein, the terms "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In this particular embodiment, the reaction component 270 associated algorithms 264A-n, and further, the respective components 310, 320, 330, 340, 350, 360, and 370, and associated algorithms 364A-n can include machine learning and reasoning techniques and technologies that employ probabilistic and/or statistical-based analysis to prognose or infer an action that a user desires to be automatically performed. The various embodiments presented herein can utilize various machine learning-based schemes for carrying out various aspects thereof. For example, a process for determining (a) a reaction 260A-n to a sound, and (b) the location of a sound event in any of sound waves 137A-n, 155A-n, and 220A-n, and the source 140A-n, giving rise to the reaction 260A-n, can be facilitated via an automatic classifier system and process.

A classifier is a function that maps an input attribute vector, x=(x1, x2, x3, x4, xn), to a class label class (x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed (e.g., identification of a sound event based on a reaction 260A-n).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to predetermined criteria, a sound event (e.g., application of sound waves 155A-n to sound waves 137A-n) in conjunction with an occupant's reaction 260A-n to the sound event, for example.

As described supra, inferences can be made, and operations performed, based on numerous pieces of information. For example, as sound dataset 130 is compiled with information/data generated by the respective components included in, or in communication with, the soundscape system 105 and the information/data accumulates (e.g., in memory 114, database 178) regarding sounds, sound wave interactions, and suchlike, the sound dataset 130 can be analyzed to determine converging patterns such that inferences can be made regarding sound events and the likely occupant reaction.

Figure 5:
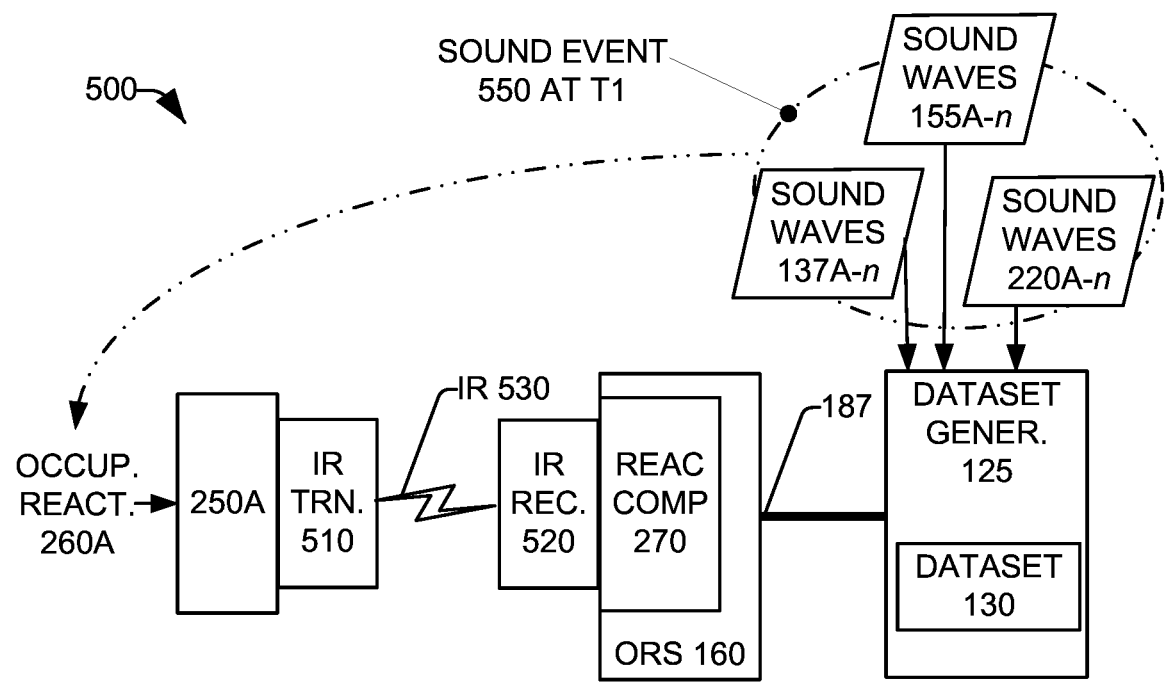
FIG. 5 presents a system configured to capture an occupant's reaction and minimize latency across a soundscape system, according to one or more embodiments.

FIG. 5, system 500 presents a system configured to capture an occupant's reaction and minimize latency across a soundscape system, according to one or more embodiments. As previously mentioned, latency across the soundscape system 105 should be kept to a minimum to enable occupant reactions 260A-n to be synchronized with an event (e.g., event 550 at T1) in any of sound waves 137A-n, 155A-n, and/or 220A-n.

In the example system presented in FIG. 5, an occupant's reaction 260A to the sound event 550 (e.g., at T1 of FIG. 3) is captured by a switch 250A, wherein the switch 250A includes an infra-red transmitter 510. The infra-red transmitter 510 can be coupled with infra-red receiver 520, wherein the reaction 260A is converted and transmitted as infra-red signal 530 to the infra-red receiver 520. Infra-red receiver 520 can be further coupled to reaction component 270 included in ORC 160. Further, the ORC 160 can be connected to the dataset generator component 125 via network 187 (e.g., a FLEXRAY, a CAN, Ethernet, and/or a LIN network). As mentioned, the dataset generator component 125 can be configured to compile and transmit sound dataset 130. Accordingly, by minimizing the latency across the system 500, it is possible to identify a sound event 550 (e.g., in any of sound waves 137A-n, 155A-n, and/or 220A-n) corresponding to occupant reaction 260A.

Figure 6:
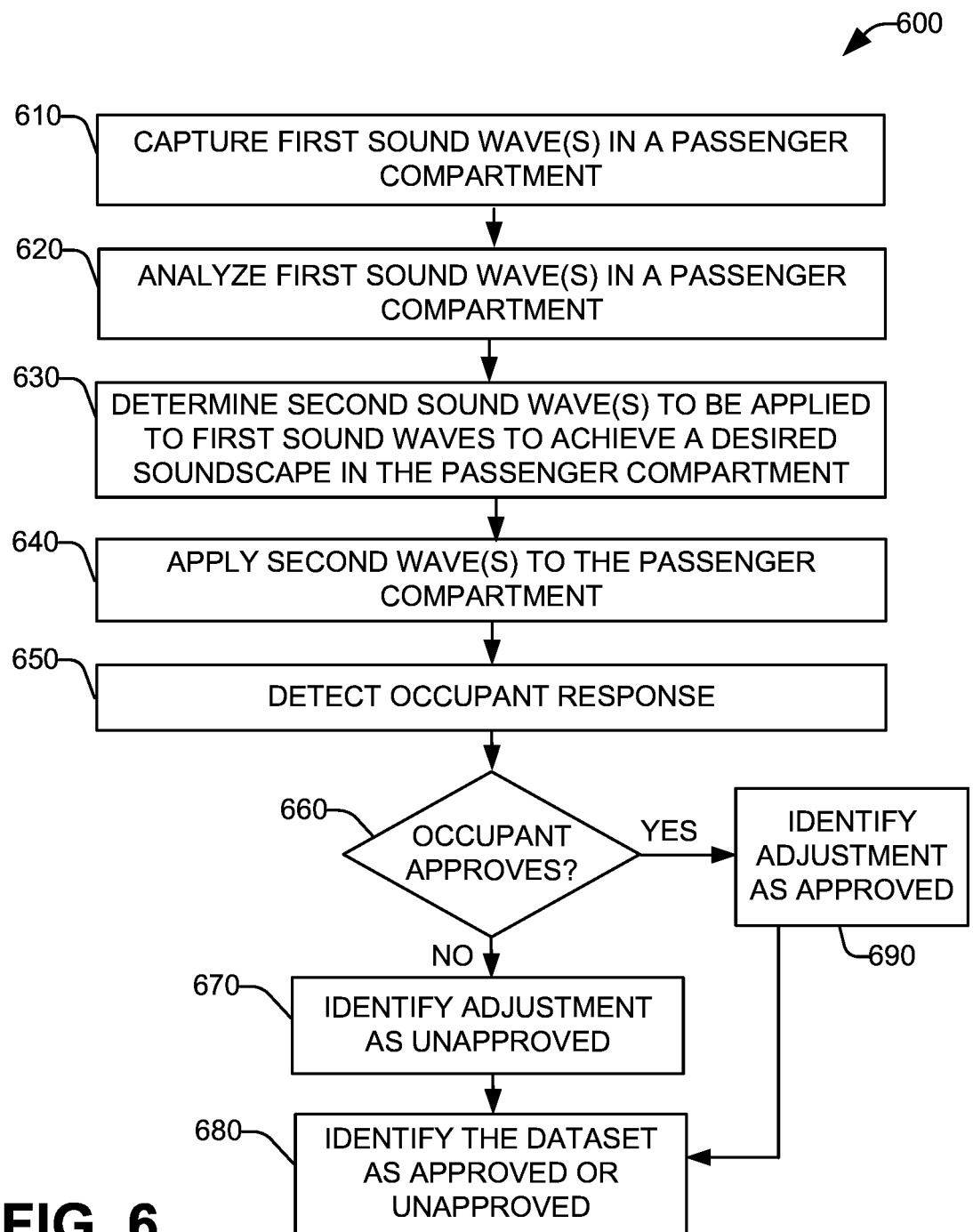
FIG. 6 illustrates a flow diagram for a computer-implemented methodology to detect a reaction to a soundscape created in a passenger compartment, in accordance with at least one embodiment.

FIG. 6 illustrates a flow diagram 600 for a computer-implemented methodology to detect a reaction to a soundscape created in a passenger compartment, in accordance with at least one embodiment.

At 610, a first soundscape present in a passenger compartment (e.g., passenger compartment 202) can be determined. Determination can be based on one or more first sound waves (e.g., one or more sound waves 137A-n) present in the passenger compartment as detected by one or more sensors (e.g., one or more sensors 135A-n, such as microphones configured to convert sound energy to signal energy), wherein the signals can be received at a dataset generation component (e.g., dataset generator component 125) configured to generate a sound dataset (e.g., sound dataset 130).

At 620, in an embodiment, the one or more first sound waves can be analyzed to determine their respective form and according soundscape present in the passenger compartment.

At 630, based on the analysis of the first sound waves, one or more second sound waves (e.g., one or more sound waves 155A-n) can be determined, such that when the one or more second sound waves are applied to the one or more first sound waves, it is intended that one or more third sound waves (220A-n) are generated and present to create a particular soundscape in the passenger compartment.

At 640, the one or more second sound waves are generated and transmitted into the passenger compartment to create the desired soundscape in the passenger compartment, but there is no guarantee that the desired soundscape will be created (e.g., given the seats, layout, external noises, etc.).

At 650, a response (e.g., reaction 260A-n) of an occupant (e.g., occupant 210) in the passenger compartment can be detected by one or more sensors (e.g., switch 250A, face sensor 250B, motion detection sensor 250C, speech sensor 250D, physical condition sensor 250E, or other sensor 250n in one or more sensors 250A-n), wherein the detected response can be input from the respective sensor into an occupant reaction component (e.g., reaction component 270).

At 660, a determination can be performed (e.g., by the reaction component 270 in conjunction with algorithms 264A-n) regarding whether the response indicates the occupant approves of the soundscape within the passenger compartment or not. In response to a determination that the response indicates that NO, the occupant does not approve of the soundscape, methodology 600 can advance to 670 wherein the soundscape resulting from application of the one or more second wound waves can be identified as not approved by the occupant.

At 680, the unapproved soundscape identifier can be combined with the soundscape data set comprising the one or more first sound waves, the one or more second sound waves, and the one or more third sound waves, wherein the combination can be labeled as unapproved.

Returning to 660, in response to a determination that the response indicates that YES, the occupant approves of the soundscape, the one or more sound waves in combination with the one or more first sound waves created an agreeable soundscape comprising the one or more third sound waves, methodology 600 can advance to 690 wherein the soundscape is indicated to be approved by the occupant. Methodology can further advance to 680, wherein the approved soundscape identifier can be combined with the soundscape data set comprising the one or more first sound waves, the one or more second sound waves, and the one or more third sound waves, wherein the combination can be labeled as approved.

Figure 7:
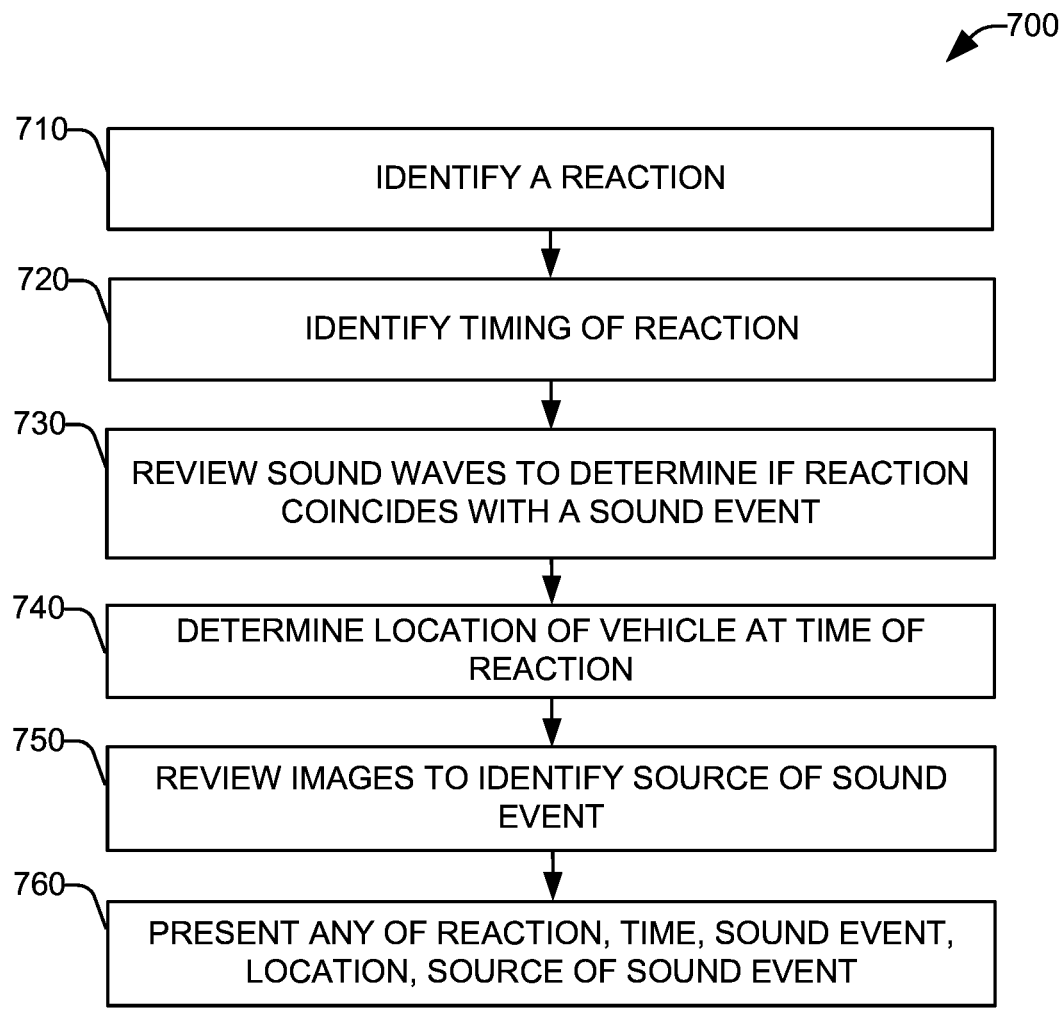
FIG. 7 illustrates a flow diagram for a computer-implemented methodology to detect a reaction to a sound event present in a passenger compartment of a vehicle, in accordance with at least one embodiment.

FIG. 7 illustrates a flow diagram 700 for a computer-implemented methodology to detect a reaction to a sound event present in a passenger compartment of a vehicle, in accordance with at least one embodiment.

At 710, a dataset (e.g., sound dataset 130) can be reviewed (e.g., by sound analysis system 190) to determine when a reaction (e.g., reaction(s) 260A-n) to a sound (e.g., a sound event 550 in any of sound waves 137A-n, sound waves 155A-n, or sound waves 220A-n) present in a passenger compartment (e.g., passenger compartment 202 of vehicle 102) occurred.

At 720, a time (e.g., time 186, timings T1, T2, T3) associated with the reaction can be identified (e.g., by sound wave analyzer component 320).

At 730, respective sound wave recordings (e.g., any of sound waves 137A-n, sound waves 155A-n, or sound waves 220A-n) can be analyzed (e.g., by sound wave analyzer component 320) to identify an event (e.g., any of T1, T2, T3, in the one or more sound wave recordings that coincides with the time associated with the reaction.

At 740, a series of location data (e.g., GPS data 172) can be analyzed (e.g., by GPS data analyzer 340) to determine a location of the vehicle (e.g., vehicle 102) at the time at which the event occurred.

At 750, a series of images (e.g., images 176A-n) can be analyzed (e.g., by image analyzer component 330) to determine a source (e.g., sound source 140A-n) of the sound event, for example, in the event that the noise was generated by an event occurring external to the vehicle or the noise event was generated from within the passenger compartment.

At 760, the identified reaction, time, sound recordings, location, and images can be presented (e.g., on screen 319) for further analysis to determine whether the sound event was approved or disapproved by the occupant, and further, any future sound waves (e.g., sound waves 155A-n) to be generated.

Figure 8:
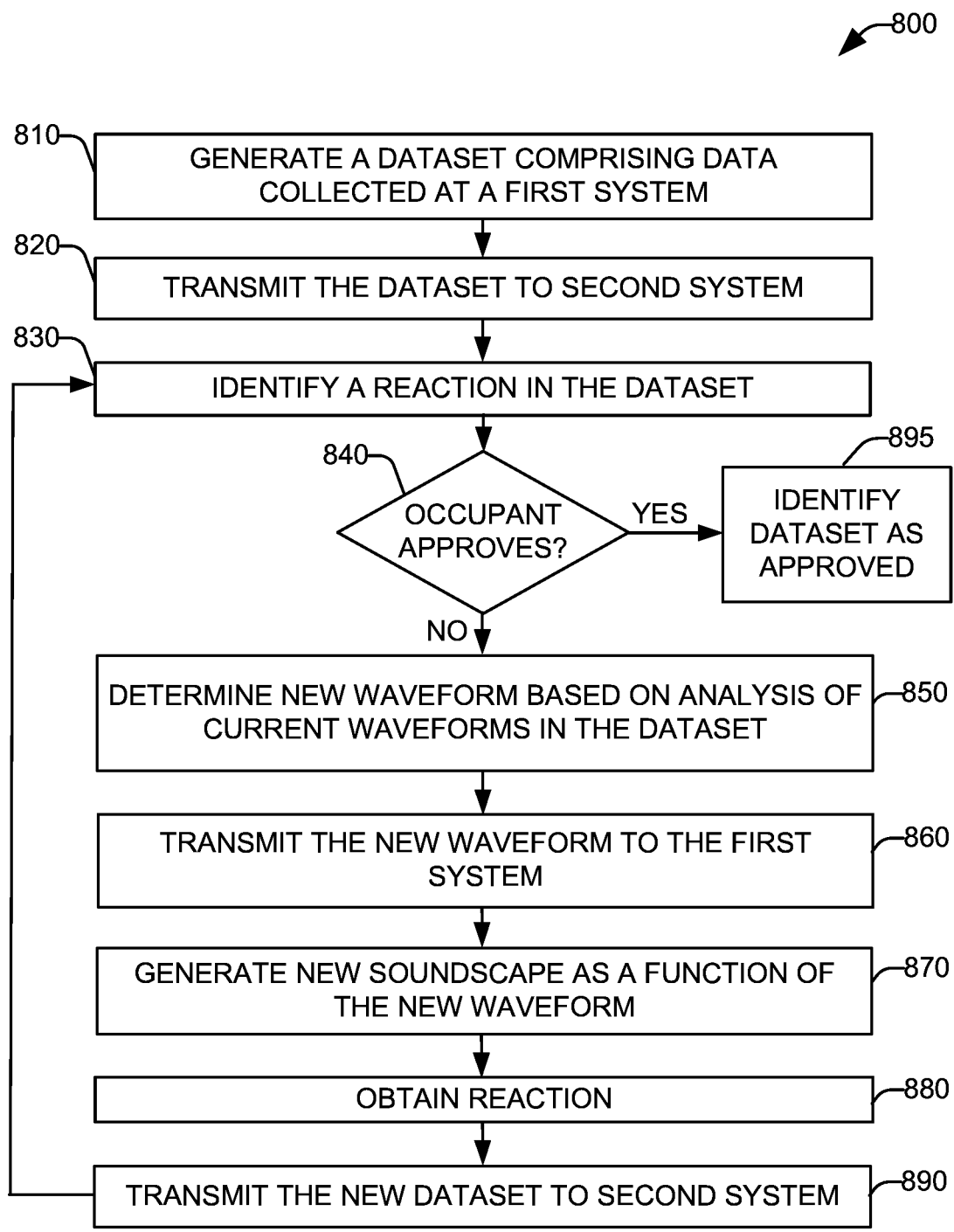
FIG. 8 illustrates a flow diagram for a computer-implemented methodology to detect a reaction to a soundscape created in a passenger compartment, in accordance with at least one embodiment.

FIG. 8 illustrates a flow diagram 800 for a computer-implemented methodology to detect a reaction to a soundscape created in a passenger compartment, in accordance with at least one embodiment.

At 810, a dataset (e.g., sound dataset 130) is generated by a soundscape system (e.g., soundscape system 105) on a vehicle (e.g., vehicle 102), wherein the dataset includes a first soundscape (e.g., sound wave 220A) generated based upon interaction of a first sound wave (e.g., sound wave 155A) with a second sound wave (e.g., sound wave 137A) to create a third sound wave (e.g., sound wave 220A). The dataset further comprises a first reaction (e.g., reaction 260A from occupant 210) to the soundscape.

At 820, signals (e.g., signals 195A-n) that include the dataset are transmitted (e.g., from soundscape system 105 via I/O 116 and antenna 117) to a remote system (e.g., to sound analysis system 190, via an I/O 316 and antenna 317).

At 830, the dataset is analyzed at the remote system (e.g., by RDC 310, sound wave review component 350, in conjunction with algorithms 364A-n) to identify the occupant's reaction.

At 840, a determination is made as to whether the occupant's reaction is positive or negative. In the event of the occupant's reaction is determined to be negative, methodology 800 advances to 850, wherein a new waveform is determined (e.g., by sound wave review component, sound wave generator 370, and algorithms 364A-n) that may meet the occupant's approval. In an example, the first wave, second wave, and third wave are analyzed to determine a new wave/fourth wave (e.g., waveform 375A generated by sound wave generator 370) to be applied to the second wave (e.g., sound wave 137A).

At 860, the new wave/fourth wave is transmitted from the remote system to the soundscape system (e.g., via I/O 316 and antenna 317 using signals 195A-n to I/O 116 and antenna 117).

At 870, a second soundscape (e.g., sound wave 220B) is generated at the vehicle based on interaction of the new wave (e.g., sound wave 155B generated based on waveform 375A) with the second wave (e.g., sound wave 137A) to create a fifth wave (e.g., sound wave 220B).

At 880, a second reaction (e.g., reaction 260B) to the to second soundscape is captured (e.g., by reaction component 270 operating in conjunction with sensors 250A-n).

At 890, the second soundscape, second wave, fourth wave, and fifth wave are combined (e.g., by dataset generator component 125) with the second reaction (e.g., as fused sound dataset 130B) and transmitted to the remote system. Methodology can return to 830, whereupon the latest reaction to the new waveform can be determined. Methodology 800 can further advance to 840 based upon the determination. In the event of the occupant reaction still indicates the occupant does not approve of the soundscape, methodology 800 can further advance through steps 850 to 890 as a subsequently new waveform and associated sound wave are identified and applied to the passenger compartment.

Example Operating Environment and Scenarios

Figure 9:
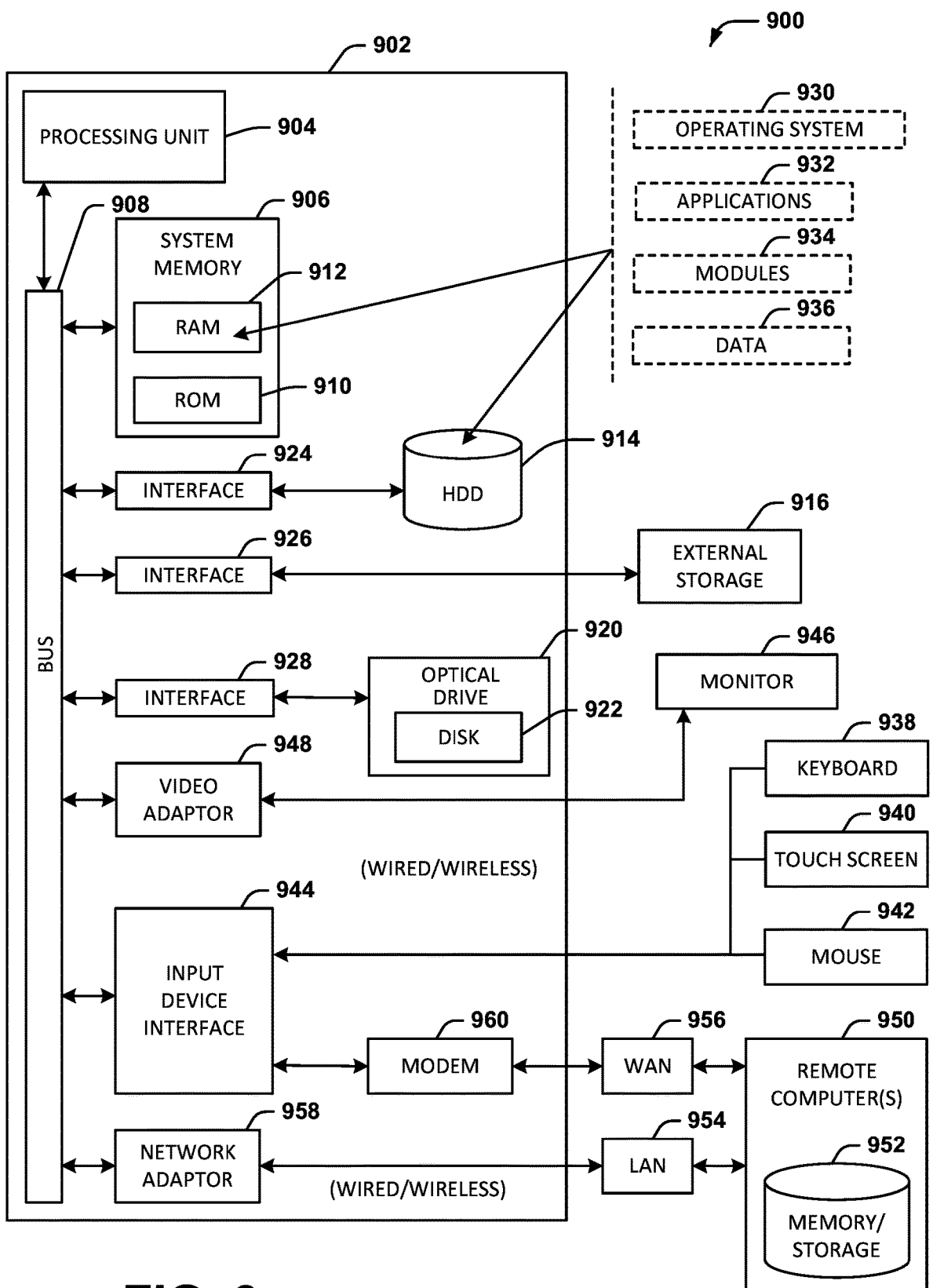
FIG. 9 is a block diagram illustrating an example computing environment in which the various embodiments described herein can be implemented.
Figure 10:
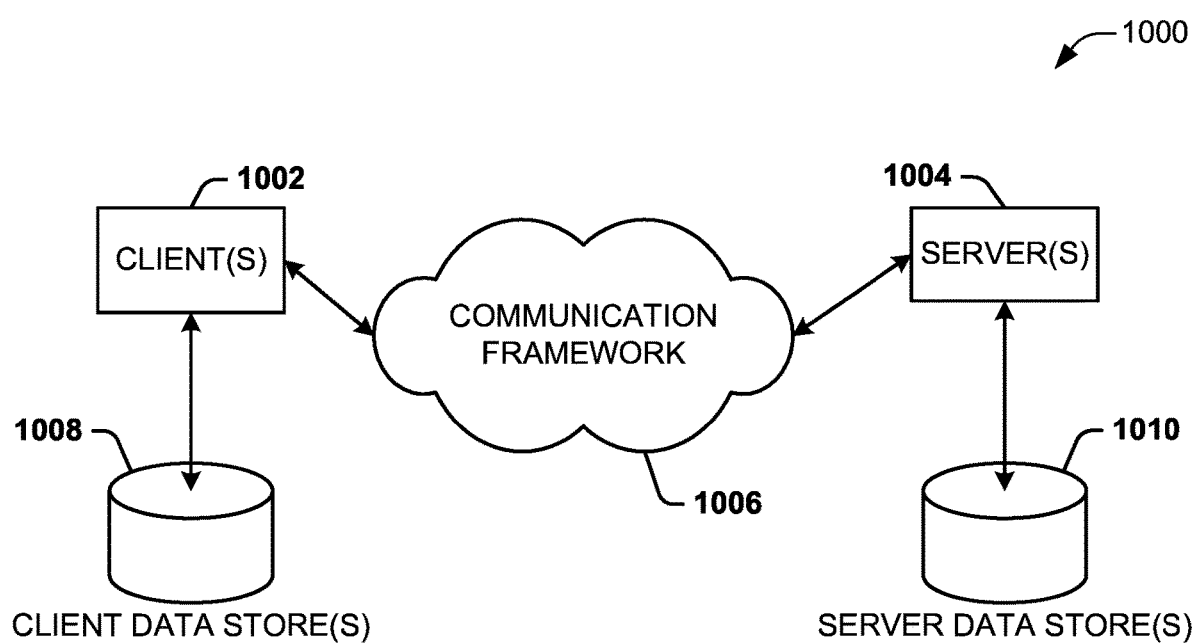
FIG. 10 is a block diagram illustrating an example computing environment with which the disclosed subject matter can interact, in accordance with an embodiment.

Turning next to FIGS. 9 and 10, a detailed description is provided of additional context for the one or more embodiments described herein with FIGS. 1-8.

In order to provide additional context for various embodiments described herein, FIG. 9 and the following discussion are intended to provide a brief, general description of a suitable computing environment 900 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infra-red and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors and may include a cache memory. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can comprise a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infra-red (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1094 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

Referring now to details of one or more elements illustrated at FIG. 10, an illustrative cloud computing environment 1000 is depicted. FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client entity," "consumer," "client entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, located on a vehicle, comprising:
   a memory that stores computer executable components; and
   a processor that executes the computer executable components stored in the memory, wherein the computer executable components comprise:
      an occupant reaction component configured to detect and record a reaction to a soundscape; and
      a dataset generator component configured to compile a dataset comprising:
         the soundscape formed from a first sound wave, a second sound wave, and a third sound wave, wherein the soundscape is present in a passenger compartment of the vehicle, wherein the first sound wave is a sound present during operation of the vehicle, wherein the second sound wave is generated by a sound generator of the vehicle to suppress or enhance the first sound wave, and wherein the third sound wave is formed from an interaction between the first sound wave and the second sound wave; and
         the recorded reaction, wherein the reaction indicates whether the soundscape is approved or rejected.

2. The system of claim 1, wherein the occupant reaction component comprises a switch, a facial recognition sensor, a motion sensor, a speech sensor, or a physical condition sensor.

3. The system of claim 1, wherein the dataset further comprises global positioning system data indicating a location of the vehicle when the reaction was detected.

4. The system of claim 1, wherein the dataset further comprises at least one digital image generated at a time when the reaction was detected, wherein the at least one digital image is created by a camera onboard the vehicle.

5. The system of claim 1, wherein the dataset further comprises vehicle data, and wherein the vehicle data comprises at least one of velocity data, acceleration data, deceleration data, or braking data generated when the reaction was detected.

6. The system of claim 1, further comprising a clock, wherein the clock is configured to operate according to a network time protocol (NTP), and wherein operation of the occupant reaction component and operation of the dataset generator component are synchronized based on the clock.

7. The system of claim 1, wherein the sound generator is further configured to:
receive a waveform; and
generate the second sound wave based on the waveform.

8. A computer-implemented method comprising:
compiling, by a device comprising a processor located on a vehicle, a dataset, wherein the dataset comprises a soundscape formed from a first sound wave, a second sound wave, and a third sound wave, wherein the first sound wave is a sound present during operation of the vehicle, wherein the second sound wave is generated by a sound generator of the vehicle to suppress or enhance the first sound wave, and wherein the third sound wave is formed from an interaction between the first sound wave and the second sound wave;
detecting, by the device, a reaction from an occupant of the vehicle, wherein the reaction is in response to at least one of the first sound wave, the second sound wave, or the third sound wave; and
supplementing, by the device, the dataset with the detected reaction.

9. The computer-implemented method of claim 8, wherein the soundscape is present in a passenger compartment of the vehicle and the occupant is located in the passenger compartment.

10. The computer-implemented method of claim 8, wherein the reaction is detected by a switch, a facial recognition sensor, a motion sensor, a speech sensor, or an occupant physical condition sensor.

11. The computer-implemented method of claim 8, further comprising supplementing, by the device, the dataset with at least one of global positioning system (GPS) data indicating a location of the vehicle at a time the reaction was detected or at least one digital image depicting the location of the vehicle at the time the reaction was detected.

12. The method of claim 8, wherein the dataset further comprises vehicle data, and wherein the vehicle data comprises at least one of velocity data, acceleration data, deceleration data, or braking data generated when the reaction was detected.

13. The method of claim 8, wherein the sound generator is configured to:
receive a waveform; and
generate the second sound wave based on the waveform.

14. A computer program product for determining response to a soundscape, the computer program product comprising a non-transitory computer readable medium having program instructions embodied therewith, the program instructions executable by a processor to cause the processor to:
compile, by a device comprising a processor located on a vehicle, a dataset, wherein the dataset comprises the soundscape formed from a first sound wave, a second sound wave, and a third sound wave, wherein the first sound wave is a sound present during operation of the vehicle, wherein the second sound wave is generated by a sound generator of the vehicle to suppress or enhance the first sound wave, and wherein the third sound wave is formed from an interaction between the first sound wave and the second sound wave;
detect a reaction from an occupant of the vehicle, wherein the reaction is in response to at least one of the first sound wave, the second sound wave, or the third sound wave; and
supplement the dataset with the detected reaction.

15. The computer program product of claim 14, wherein the soundscape is present in a passenger compartment of the vehicle and the occupant is located in the passenger compartment.

16. The computer program product of claim 14, wherein the reaction is detected by a switch, a facial recognition sensor, a motion sensor, a speech sensor, or an occupant physical condition sensor.

17. The computer program product of claim 14, wherein the program instructions are further executable by the processor to cause the processor to:
supplement the dataset with global positioning system (GPS) data indicating a location of the vehicle at a time the reaction was detected.

18. The computer program product of claim 14, wherein the program instructions are further executable by the processor to cause the processor to:
supplement the dataset with at least one digital image depicting a location of the vehicle at a time the reaction was detected.

19. The computer program product of claim 14, wherein the dataset further comprises vehicle data, and wherein the vehicle data comprises at least one of velocity data, acceleration data, deceleration data, or braking data generated when the reaction was detected.

20. The computer program product of claim 14, wherein the sound generator is configured to:
receive a waveform; and
generate the second sound wave based on the waveform.

* * * * *